(12) United States Patent
Watanabe

(10) Patent No.: US 12,430,917 B2
(45) Date of Patent: Sep. 30, 2025

(54) UNATTENDED OBJECT MONITORING DEVICE, UNATTENDED OBJECT MONITORING SYSTEM EQUIPPED WITH SAME, AND UNATTENDED OBJECT MONITORING METHOD

(71) Applicant: PANASONIC INTELLECTUAL PROPERTY MANAGEMENT CO., LTD., Osaka (JP)

(72) Inventor: Takeshi Watanabe, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 428 days.

(21) Appl. No.: 17/916,967

(22) PCT Filed: Mar. 17, 2021

(86) PCT No.: PCT/JP2021/010805
§ 371 (c)(1),
(2) Date: Oct. 4, 2022

(87) PCT Pub. No.: WO2021/205831
PCT Pub. Date: Oct. 14, 2021

(65) Prior Publication Data
US 2023/0169773 A1    Jun. 1, 2023

(30) Foreign Application Priority Data
Apr. 6, 2020   (JP) .................... 2020-068193

(51) Int. Cl.
*G06V 20/52*   (2022.01)
*G06V 20/60*   (2022.01)

(52) U.S. Cl.
CPC .............. *G06V 20/52* (2022.01); *G06V 20/60* (2022.01); *G06V 2201/07* (2022.01)

(58) Field of Classification Search
CPC .... G06V 20/52; G06V 20/60; G06V 2201/07; G06V 10/25; G06V 10/26; G06V 10/62;
(Continued)

(56) References Cited

U.S. PATENT DOCUMENTS 8,159,537 B2 * 4/2012 Itoh ................. G08B 13/19652
                                                                 348/155
9,058,523 B2 * 6/2015 Merkel ............ G08B 13/19652
(Continued)

FOREIGN PATENT DOCUMENTS

JP      01-245395      9/1989
JP      2008-181347    8/2008
(Continued)

OTHER PUBLICATIONS

"Unattended Object Detection and Tracking"; Pantongdee et al.; IEEE 7th International Conference on Engineering Technologies and Applied Sciences; 2020. (Year: 2020).*
(Continued)

*Primary Examiner* — David Ometz
(74) *Attorney, Agent, or Firm* — GREENBLUM & BERNSTEIN, P.L.C.

(57) ABSTRACT

Provided is an unattended object monitoring device for detecting an unattended object in a monitoring area and issuing an alarm therefor, while excluding a detected object for which issuance of an alarm is unnecessary from alarm target objects for which alarms are issued. An unattended object monitoring device is configured to: detect an object appearing in a monitoring area from images of the area captured by an image pickup device to track each detected object between the captured images; detect, as an unattended object, an object that does not move for more than a predetermined time based on a tracking result; determine if the detected unattended object is present in a mask area (Continued)

preset in the monitoring area; and exclude the detected unattended object which is present in the mask area from alarm target objects for which alarms are issued.

11 Claims, 13 Drawing Sheets

(58) Field of Classification Search
CPC ........ G06T 7/254; G08B 21/00; G08B 25/00; H04N 7/18
See application file for complete search history.

(56) References Cited

U.S. PATENT DOCUMENTS

| 10,607,348 B2* | 3/2020 | Watanabe | H04N 7/183 |
|---|---|---|---|
| 2006/0170769 A1* | 8/2006 | Zhou | G06V 20/52 |
| | | | 382/103 |
| 2019/0019296 A1* | 1/2019 | Watanabe | H04N 7/188 |
| 2019/0114885 A1* | 4/2019 | Lin | G08B 13/19656 |
| 2019/0259165 A1* | 8/2019 | Watanabe | G08B 21/24 |
| 2021/0174094 A1 | 6/2021 | Oami | |
| 2022/0044028 A1 | 2/2022 | Oami | |
| 2023/0351757 A1 | 11/2023 | Oami | |
| 2023/0410517 A1 | 12/2023 | Oami | |
| 2023/0410518 A1 | 12/2023 | Oami | |

FOREIGN PATENT DOCUMENTS

| JP | 2013-98797 | 5/2013 |
|---|---|---|
| JP | 2018-42270 | 3/2018 |
| JP | 2019-71578 | 5/2019 |
| WO | 2018/179202 | 10/2018 |

OTHER PUBLICATIONS

Official Communication issued in International Patent Application No. PCT/JP2021/010805, dated Jun. 15, 2021, along with an English translation thereof.
Jan. 9, 2024 Office Action in corresponding Japanese patent application No. 2020-068193 and the English translation thereof.

* cited by examiner

Fig.5 mask area information

| mask area name | des unatndd object | coord of frame img | color of frame img | usage period |
|---|---|---|---|---|
| A1 | store signboard | (x800, y300)<br>(x900, y200) | red | time zone; 8:00-22:00<br>day of week: Mon to Fri |
| ⋮ | ⋮ | ⋮ | ⋮ | ⋮ |

UNATTENDED OBJECT MONITORING DEVICE, UNATTENDED OBJECT MONITORING SYSTEM EQUIPPED WITH SAME, AND UNATTENDED OBJECT MONITORING METHOD

TECHNICAL FIELD

The present invention relates to an unattended object monitoring device, an unattended object monitoring system equipped with the same, and an unattended object monitoring method for detecting an unattended object left behind in a monitoring area based on images of the monitoring area captured by an image pickup device, and issuing an alarm when detecting the unattended object.

BACKGROUND ART

One aspect of surveillance of public spaces used by the general public (such as stations, airports, commercial facilities, shopping districts, and underground shopping districts) is directed at watching for a suspicious object left unattended in such spaces for the purpose of crime prevention. Generally, in order to watch for an unattended object in public spaces, an observer monitors images of surveillance areas captured by surveillance cameras (image pickup devices). For such surveillance systems, there is a need for technologies to automatically detect unattended objects based on images of surveillance areas, thereby reducing the burden on an observer and improving the accuracy of detection of left-unattended objects.

There are various known technologies for automatic detection of unattended objects based on images of surveillance areas captured by image pickup devices (such as one disclosed in Patent Document 1). Patent Document 1 teaches an image monitoring system configured to: calculate differences between an initially-captured background image of a monitoring area and respective images of the same area captured at predetermined time intervals to thereby cut out human images; compare the human images acquired sequentially at the predetermined time interval with each other to thereby detect an object image that can be separated from the human images; when such an object image is detected, measure an unattended time for which the object is left unattended; and when the unattended time is greater than a predetermine time period, issue an alarm.

PRIOR ART DOCUMENT (S)

Patent Document(s)

Patent Document 1: JPH01-245395A

SUMMARY OF THE INVENTION

Task to be Accomplished by the Invention

However, the system of Patent Document 1 issues alarms for any detected unattended objects regardless of the type of a detected unattended object. Thus, the system has a problem that alarms are issued for unattended objects for which issuance of alarms is unnecessary, such as a store sign on the ground (store signboard), a closed-for-cleaning sign, a construction safely cone, and an information board. When alarm are issued for unattended objects for which issuance of alarms is unnecessary, an observer needs to watch an increased number of unattended objects, resulting in an increased burden on the observer. The problem worsens when there are a large number of unattended objects for which issuance of alarms is unnecessary in a monitoring area, or when a monitoring area is large. In this light, exclusion of an unattended object for which issuance of an alarm is unnecessary from alarm target objects for which alarms are issued would be beneficial because this leads to a reduction in the burden on an observer.

The present invention has been made in view of such a problem of the prior art, and a primary object of the present invention is to provide an unattended object monitoring device, an unattended object monitoring system equipped with the same and an unattended object monitoring method which enable exclusion of a detected unattended object for which issuance of an alarm is unnecessary from alarm target objects for which alarms are issued.

Means to Accomplish the Task

An aspect of the present invention provides an unattended object monitoring device for detecting an unattended object left behind in a monitoring area based on images of the monitoring area captured by an image pickup device, and issuing an alarm when detecting the unattended object, the device comprising: a processing device for performing processing operations required for detecting unattended objects, wherein the processing device is configured to: detect an object appearing in the monitoring area from captured images captured by the image pickup device and track each detected object between the captured images; detect, as an unattended object, an object that does not move for more than a predetermined time based on a tracking result for each detected object; determine whether or not the detected unattended object is present in a mask area preset in the monitoring area; and when determining that the detected unattended object is present in the mask area, exclude the detected unattended object from alarm target objects for which alarms are issued.

Effect of the Invention

According to the present invention, it is possible to exclude an unattended object for which issuance of an alarm is unnecessary from alarm target objects for which alarms are issued. As a result, the burden on an observer can be reduced in particular when there are a large number of unattended objects for which issuance of alarms is unnecessary in a monitoring area, or when a monitoring area is large.

BRIEF DESCRIPTION OF THE DRAWINGS

FIG. 5 is a diagram showing an example of mask area information;

DESCRIPTION OF THE PREFERRED EMBODIMENT(S)

Figure 1:
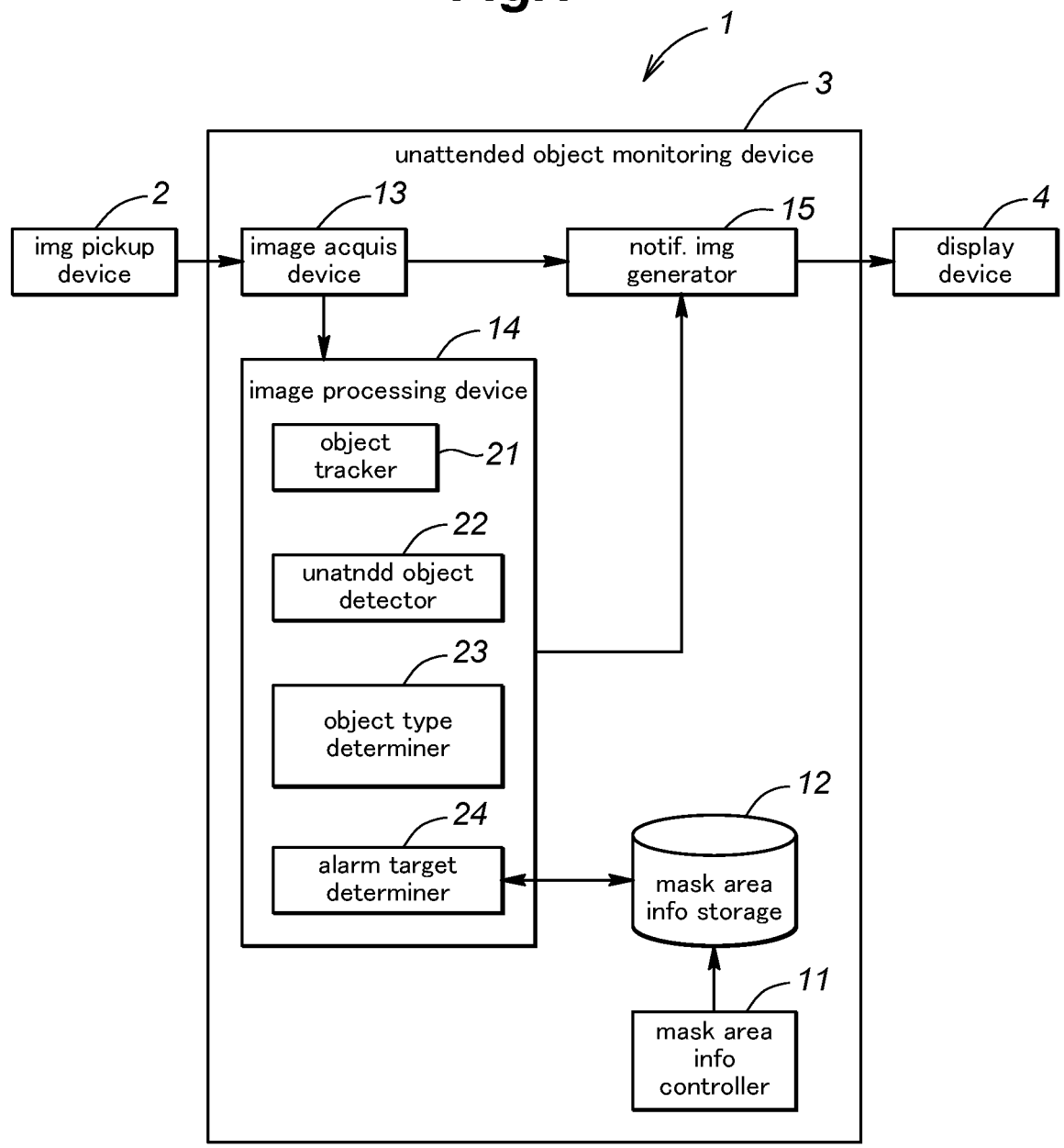
FIG. 1 is a diagram showing a schematic configuration of an unattended object monitoring system according to a first embodiment of the present invention.

A first aspect of the present invention made to achieve the above-described object is an unattended object monitoring device for detecting an unattended object left behind in a monitoring area based on images of the monitoring area captured by an image pickup device, and issuing an alarm when detecting the unattended object, the device comprising: a processing device for performing processing operations required for detecting unattended objects, wherein the processing device is configured to: detect an object appearing in the monitoring area from captured images captured by the image pickup device and track each detected object between the captured images; detect, as an unattended object, an object that does not move for more than a predetermined time based on a tracking result for each detected object; determine whether or not the detected unattended object is present in a mask area preset in the monitoring area; and when determining that the detected unattended object is present in the mask area, exclude the detected unattended object from alarm target objects for which alarms are issued.

In this configuration, it is possible to exclude an unattended object that is determined to be present in a preset mask area in a monitoring area from alarm target objects for which alarms are issued. This reduces the number of alarm target objects for which alarms are issued, thereby enabling a reduction in the burden on an observer.

A second aspect of the present invention is the unattended object monitoring device of the first aspect, wherein the processing device generates a setting screen that enables a user to set the mask area in the monitoring area.

In this configuration, a user can easily set a mask area with a simple operation.

A third aspect of the present invention is the unattended object monitoring device of the first aspect, wherein the processing device determines an object type of the detected unattended object.

In this configuration, a user can recognize the type of a detected unattended object.

A fourth aspect of the present invention is the unattended object monitoring device of the third aspect, wherein the mask area is set in association with an object type, and wherein the processing device is configured to: when determining that the detected unattended object is present in the mask area, further determine whether or not the object type of the unattended object is one associated with the mask area; and only when determining that the object type of the unattended object is one associated with the mask area, exclude the detected unattended object from alarm target objects for which alarms are issued.

In this configuration, an unattended object that is determined to be present in the mask area can be excluded from alarm target objects for which alarms are issued only when the object type of the unattended object is one associated with the mask area. This configuration can exclude objects of types for which issuance of alarms is unnecessary, from alarm target objects for which alarms are issued, thereby enabling a further reduction in the burden on an observer.

A fifth aspect of the present invention is the unattended object monitoring device of the third or fourth aspect, wherein the processing device generates images in which a frame image surrounding the mask area is overlaid on the captured images, and wherein the processing device determines a form of the frame image depending on the object type associated with the mask area.

In this configuration, a frame image can be a clear visual indication of a mask area, which enables a user to easily recognize the geometry of the mask area in the image. In addition, as a form of the frame image is determined according to the object type of an unattended object, the frame image can also be a clear visual indication of the object type of an unattended object associated with the mask area.

A sixth aspect of the present invention the unattended object monitoring device of the fourth or fifth aspect, wherein the processing device is configured to: detect a representative position of the unattended object where the object type of the unattended object has been determined to be one associated with the mask area; store data of the representative position for a predetermined period of time to create statistical data of the representative position; and change a geometry of the mask area based on the statistical data of the representative position.

In this configuration, the geometry of the mask area more can be set more accurately according to the actual position of an unattended object associated with the mask area.

A seventh aspect of the present invention is the unattended object monitoring device of any one of the first to sixth aspects, wherein the processing device determines the mask area is in association with a usage period, the usage period being a period of time in which the mask area is used, and wherein, only for a mask area having a usage period that is currently valid, the processing device determines whether or not the detected unattended object is present in the mask area.

In this configuration, a mask area can be used in the operations only when an unattended object associated with the mask area is actually used. This reduces the number of determination operations subsequent to the detection of an unattended object, thereby enabling a reduction in the burden on the device that performs the determination operations.

An eighth aspect of the present invention is the unattended object monitoring device of any one of the first to seventh aspects, wherein the processing device detects a representative position of the detected unattended object, and determine, based on the detected representative position, whether or not the detected unattended object is present in the mask area.

This configuration enables more accurate and easier determination of whether or not a detected unattended object is present in a mask area based on the detected representative position of the detected unattended object.

A ninth aspect of the present invention is the unattended object monitoring device of any one of the first to eighth aspects, wherein, when detecting a plurality of unattended objects in the mask area, the processing device performs the subsequent determination operations for each of the plurality of unattended objects.

This configuration can ensure that, even when two or more unattended objects are detected in a single mask area, the device can properly perform the subsequent determination operations for each unattended object.

A tenth aspect of the present invention is an unattended object monitoring system comprising: the unattended object monitoring device according to any one of the first to ninth aspects; an image pickup device for capturing an image of a monitoring area; and a notification device for notifying a user of an alarm issued from the unattended object monitoring device.

An eleventh aspect of the present invention is an unattended object monitoring method for detecting an unattended object left behind in a monitoring area based on images of the monitoring area captured by an image pickup device, and issuing an alarm when detecting the unattended object, the method comprising: acquiring captured images of the monitoring area captured by the image pickup device; detecting an object appearing in the monitoring area from captured images and tracking each detected object between the captured images; detecting, as an unattended object, an object that does not move for more than a predetermined time based on a tracking result for each detected object; determining whether or not the detected unattended object is present in a mask area preset in the monitoring area; and when determining that the detected unattended object is present in the mask area, excluding the detected unattended object from alarm target objects for which alarms are issued.

Embodiments of the present invention will be described below with reference to the drawings.

First Embodiment

An unattended object monitoring system 1 according to a first embodiment of the present invention will be described with reference to FIGS. 1 to 10. The unattended object monitoring system 1 is configured to detect an unattended object left behind in a monitoring area based on images of the monitoring area captured by an image pickup device 2, and issue an alarm when such an unattended object is detected. The unattended object monitoring system 1 can be used to watch for a suspicious object left unattended in public spaces used by the general public (such as stations, airports, commercial facilities, shopping districts, and underground shopping districts).

The present invention will be described in the following with reference to embodiments in which the unattended object monitoring system 1 according to the present invention is used to watch for a suspicious object left unattended in public spaces used by the general public (such as stations, airports, commercial facilities, shopping districts, and underground shopping districts). In commercial facilities, shopping districts, and underground shopping districts, there are many unattended objects for which issuance of alarms is unnecessary, such as store signs on the ground (store signboards) and closed-for-cleaning signs. Thus, exclusion of unattended objects for which issuance of alarms is unnecessary from alarm target objects for which alarms are issued (hereinafter, simply referred to as "alarm target(s)") can reduce the burden on an observer.

FIG. 1 is a diagram showing a schematic configuration of the unattended object monitoring system 1 according to the first embodiment of the present invention. As shown in FIG. 1, the unattended object monitoring system 1 includes an image pickup device 2, an unattended object monitoring device 3, and a display device 4. The display device serves as a notification device for notifying an observer of alarms. The unattended object monitoring device 3 is connected to the image pickup device 2 and the display device 4 via wired or wireless communication links such as a LAN (Local Area Network; e.g., Wi-Fi (registered trademark). The communication links between the unattended object monitoring device 3, the image pickup device 2, and the display device 4 are not limited to specific forms, and examples of usable communication links may include those via a network such as the Internet, or a combination of a communication cable and a general-purpose interface (e.g., USB interface) which form connections between the devices.

The image pickup device 2 is a generally-used image pickup device such as a CCD camera and is installed on any of walls, ceilings, poles, or other parts of various places such as commercial facilities, shopping districts, and underground shopping districts so that the image pickup device 2 shoots a predetermined monitoring target area (hereinafter, simply referred to as "monitoring area") as still images and/or moving images in time series. The form, functions, arrangement, quantity, and other characteristics of the image pickup device 2 are not limited to specific ones; that is, the image pickup device 2 may have any characteristics and/or various modifications may be made to the image pickup device 2 as long as the device can capture images of the monitoring area in time series. For example, the image pickup device 2 may be a panoramic camera installed on a wall or any other surface and capable of shooting 180 degrees by one device, or an omnidirectional camera installed on a ceiling or any other surface and capable of shooting 360 degrees by one device. Time-series images of the monitoring area captured by the image pickup device 2 are provided to the unattended object monitoring device 3.

The display device 4 is a generally-used display device such as a monitor (display) installed in a monitoring room or any other place where an observer watches for unattended objects, and configured to display notification images (see FIG. 9) provided from the unattended object monitoring device 3. The details of notification images will be described later. The form, functions, arrangement, quantity, and other characteristics of the display device 4 are not limited to specific ones; that is, the display device 4 may have any characteristics and/or various modifications may be made to the display device 4 as long as the device can display notification images. For example, the display device 4 may be a display screen of a mobile terminal carried by an observer used when the observer leaves the monitoring room for patrolling or other reasons.

The unattended object monitoring device 3 is a generally-used computer device having a known configuration, and configured to detect an unattended object left behind in the monitoring area based on images captured by the image pickup device 2, to generate a notification image for a detected unattended object, if any, as an alarm, and to provide the generated notification image to the display device 4. Until an unattended object is detected, the unattended object monitoring device 3 receives captured images at an image acquisition device 13 and provides the captured images as they are to the display device 4.

Figure 2:
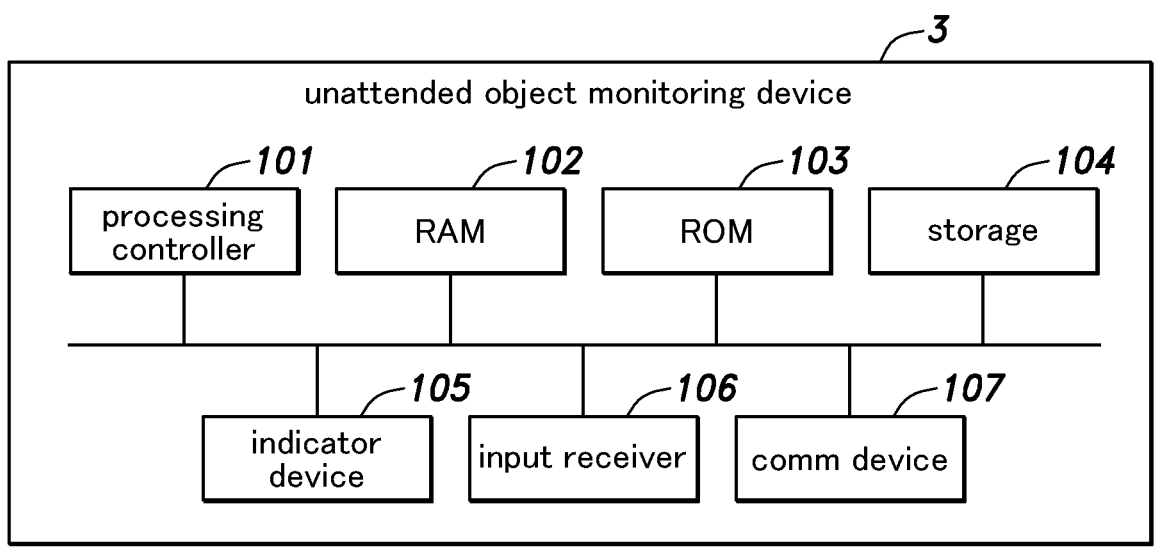
FIG. 2 is a block diagram showing a schematic configuration of an unattended object monitoring device of the unattended object monitoring system.

FIG. 2 is a block diagram showing a schematic configuration of the unattended object monitoring device 3. The unattended object monitoring device 3 has a known hardware configuration, and includes: a processing controller 101 for comprehensively executing processing operations in the unattended object monitoring system 1 based on predetermined control programs (for example, an unattended object monitoring program); a RAM 102, i.e., a volatile memory that can be used as a work area for the processing controller 101; a ROM 103, i.e., a non-volatile memory for storing control programs executable by the processing controller 101 and other data; a storage 104 for storing programs and data required for operations of the unattended object monitoring device 3; an indicator device 105 provided with a monitor for indicating information to a user; an input receiver 106 including an input device such as a keyboard or mouse for a user's input operations; and a communication device 107 provided with a communication module configured to perform communications via the network.

In the hardware configuration shown in FIG. 2, each function of the unattended object monitoring device 3 can be implemented by the processing controller 101 executing a corresponding control program. The unattended object monitoring device 3 is not limited to a computer device, and may be any other data processing device (such as a server) which can provide the same functions as the computer device. In other embodiments, at least some part of the functions of the unattended object monitoring device may be implemented by an operation(s) performed by other known hardware, instead of being implemented by the unattended object monitoring device 3.

Referring back to FIG. 1, the unattended object monitoring device 3 includes a mask area information controller 11, a mask area information storage 12, an image acquisition device 13, an image processing device 14, and a notification image generator 15. The image processing device 14 includes an object tracker 21, an unattended object detector 22, an object type determiner 23, and an alarm target determiner 24. Each of the functional units described above is controlled by a control device (not shown).

The mask area information controller 11 generates a mask area information setting screen for entry of information on each mask area to be preset in the monitoring area (hereinafter referred to as "mask area information"), and provides necessary information to the indicator device 105 (see FIG. 2) to display the mask area information setting screen. A user of the unattended object monitoring device 3 can operate an input device (such as a keyboard or a mouse) to enter various information on the mask area information setting screen, and then set the mask area information.

The mask area information for each mask area includes a name of the mask area, a geometry of the mask area, and a type of an unattended object associated with the mask area (hereinafter referred to as "designated unattended object"). The geometry of a mask area refers to a region in the monitoring area that corresponds to the mask area. Although, in the present embodiment, the geometry of the mask area is determined to have a rectangular shape, the geometry of the mask area is not limited to a rectangle and can be any of various other shapes.

The mask area information for each mask area further includes a form of a mask area frame image which indicates the geometry of the mask area, and a usage period of the mask area.

In the present embodiment, a mask area frame image is a rectangular broken line image surrounding a mask area, and is colored with a different color according to the type of a designated unattended object. A mask area frame image is not limited to a broken line image, and may be an image in any of other forms. For example, a mask area frame image may be a solid line image. A color of a mask area frame image indicating a corresponding type of a designated unattended object is not an essential feature, and the feature may be omitted if it is unnecessary.

A usage period of a mask area is information indicating a period of time (e.g., a time zone and a day of the week) in which the mask area is used; that is, when the usage period is valid, the mask area is used. As described above, a mask area is set in association with a designated unattended object. Thus, a mask area can be set in association with a designated unattended object and further with its usage period. In this case, only when the designated unattended object is actually used (placed), the mask area corresponding to the designated unattended object can be used. This configuration can reduce the number of determination operations (described later) performed by the alarm target determiner 24, thereby enabling a reduction in the burden on the device that performs the determination operations.

For example, when a designated unattended object is a store signboard, the store signboard is used only during a corresponding store's business hours and business days, and thus a mask area therefor needs to be used only in a time zone and day of the week when the store signboard is actually used. In other cases, when a designated unattended object is a construction safety cone, the construction safety cone is used only when a corresponding construction work is executed, and thus a mask area therefor needs to be used only in a time zone and day of the week of a construction period during which the construction safety cone is actually used.

Moreover, mask area information may include, in addition to the above-described information records, various other types of information. For example, mask area information may further include image data of a designated unattended object of a mask area.

Figure 3:
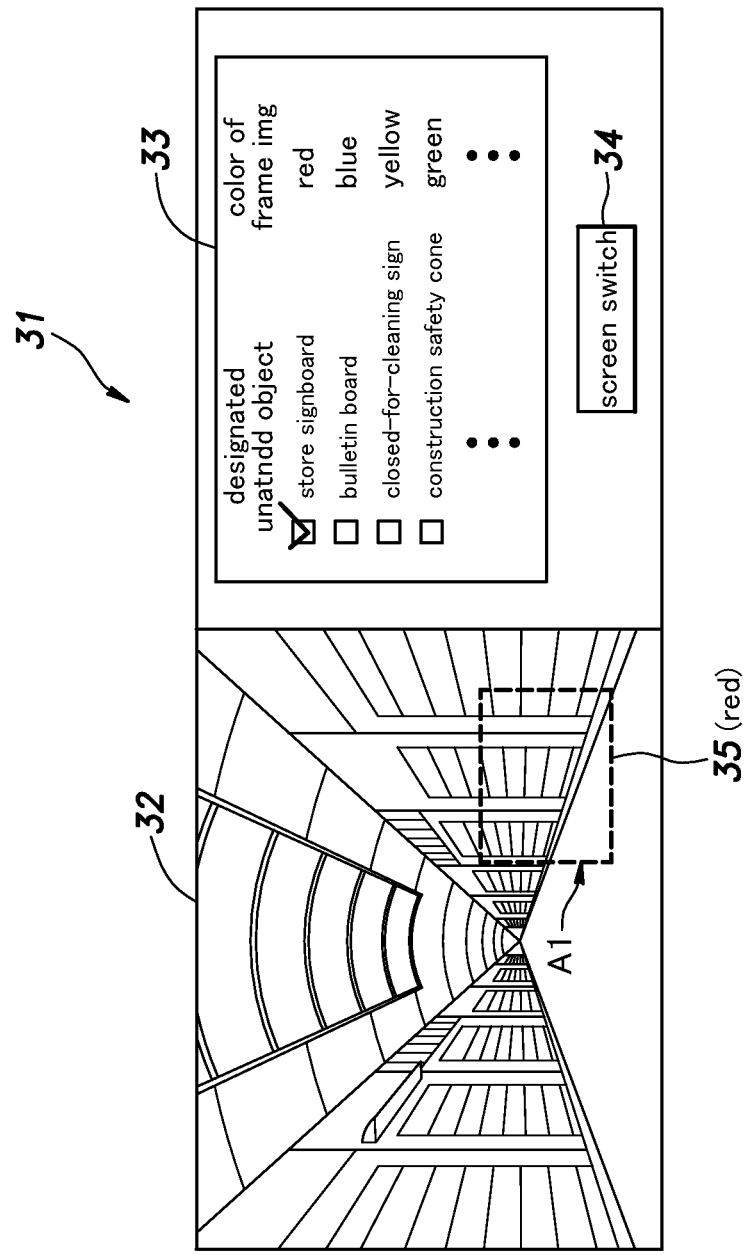
FIG. 3 is a diagram showing a mask area setting screen and an unattended object type setting screen.

FIG. 3 is a diagram showing an example of a mask area information setting screen 31 generated by the mask area information controller 11. The mask area information setting screen 31 includes a mask area setting screen 32, a screen section on the left side, and a designated unattended object setting screen 33, a screen section on the right side. Provided below the designated unattended object setting screen 33 is a screen switching button 34 for switching the designated unattended object setting screen 33 to a usage period setting screen 36 described later.

The mask area setting screen 32 displays an image of a monitoring area captured by the image pickup device 2. In the example of FIG. 3, the mask area setting screen 32 displays a captured image of a predetermined monitoring area of a shopping district.

The designated unattended object setting screen 33 includes checkboxes used for designating, for each mask area, a designated unattended object associated with the mask area, along with a color of a mask area frame image corresponding to the designated unattended object. In the example of FIG. 3, the listed designated unattended objects include a store signboard, a bulletin board, a closed-for-cleaning sign, and a construction safety cone. The listed colors of mask area frame images include red for store signboards, blue for bulletin boards, yellow for closed-for-cleaning signs, and green for construction safety cones.

When a user of the unattended object monitoring device 3 enters various information records in the mask area information setting screen 31 in order to set mask area information, first, the user needs to click a check box in the designated unattended object setting screen 33 to select a designated unattended object. In the example of FIG. 3, a store signboard is selected. Next, the user uses a mouse or any other input device to designate a desired region in the mask area setting screen 32, thereby setting a geometry of the mask area.

When the designated unattended object is a store signboard, the location of the store signboard may change daily. In addition, even after the store signboard is placed, the location of the store signboard can change due to a collision with a passerby or other reason. In this light, the geometry of a mask area is preferably broader than a region in which the store signboard is expected to be placed, so that the mask area can be used even if the location of the store signboard is changed.

In the example of FIG. 3, a mask area A1 is set on the lower right side of the mask area setting screen 32. The mask area A1 is indicated by the mask area frame image 35 surrounding the mask area. A store signboard is designated as a designated unattended object of the mask area A1, and a red color is associated with the store signboard. Thus, the mask area frame image 35 is colored red. In this way, in the example of FIG. 3, the mask area A1 is set in association with the store signboard.

In the example of FIG. 3, after the setting of a designated unattended object, the geometry of a mask area is set. However, a sequence of settings of a designated unattended object and the geometry of a mask area is not limited to this order. A user may set the geometry of a mask area before setting a designated unattended object of the mask area. In this case, when the geometry of a mask area is set, the mask area frame image 35 may be indicated in black, and then, when a designated unattended object is set, the color of the mask area frame image 35 may be changed to a color associated with the designated unattended object.

Figure 4:
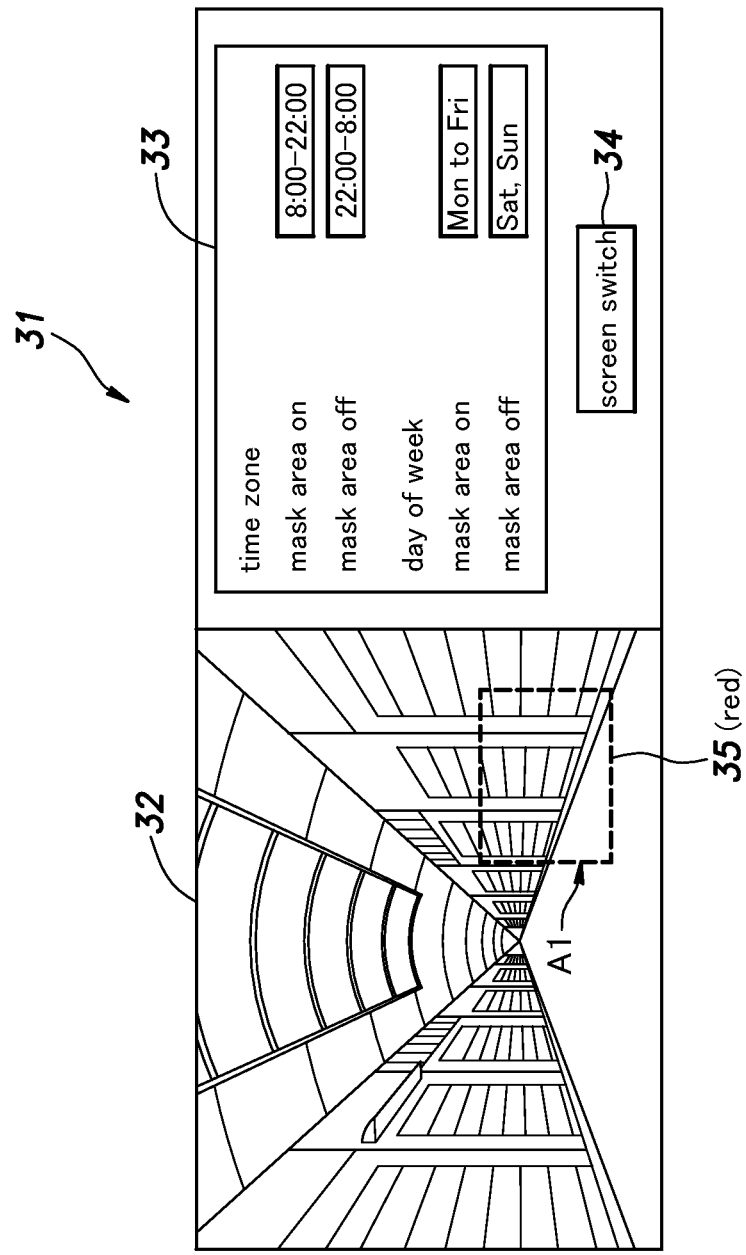
FIG. 4 is a diagram showing the mask area setting screen and a usage period setting screen.

FIG. 4 shows a usage period setting screen 36 for setting a usage period of a mask area. As described above, a user can operates the screen switching button 34 to switch the designated unattended object setting screen 33 to the usage period setting screen 36.

The usage period setting screen 36 includes entry fields for designating a usage period in which a mask area is used. In the present embodiment, a time zone and a day of the week are entered to set a usage period. However, the unit for a usage period is not limited to this example, and the usage period may be set in a day, a week, a month, or a year. In addition, a user may designate a start date and time and an end date and time to thereby set a usage period as a continuous period of time between them. When a usage period is periodically valid (i.e., a periodic usage period), the usage period is preferably set such that the usage period is valid multiple times, each time during the same time zone or day of the week, over a predetermined period of time.

In the example of FIG. 4, the time zone in which the mask area is used; that is, in which the mask area function is valid is set to "8:00 to 22:00", and the time zone in which the mask area is not used; that is, in which the mask area function is invalid is set to "22:00 to 8:00." The time zone is selected because a store that uses the store signboard, is open from 8:00 to 22:00, and the store signboard is not used during other times. In the example of FIG. 4, the day of the week when the mask area is used (the day when the mask area function is valid) is set to "Monday to Friday", and the day when the mask area is not used (the day when the mask area function is invalid) is "Saturday and Sunday." The day of the week is selected because the store business days of the store that uses this store signboard are from Monday to Friday, and the store signboard is not used on Saturday and Sunday.

The mask area information set by the mask area information controller 11 is stored in the mask area information storage 12. In the present embodiment, the geometry of a mask area is defined by the upper left coordinates and the lower right coordinates of a rectangular frame of the mask area frame image indicated on the mask area setting screen 32.

FIG. 5 is a diagram showing an example of mask area information stored in the mask area information storage 12. As shown in FIG. 5, items of the mask area information include, for each mask area, "mask area name" (the name of the mask area), "designated unattended object" (a designated unattended object of the mask area), "coordinates of frame image" (the coordinates of a mask area frame image), "color of frame image" (the color of the mask area frame image), and "usage period" (a usage period of the mask area). In the example of FIG. 5, the information for mask area A1 in "mask area name" is associated with information records including the designated unattended object "store signboard"; the coordinates of the frame image "(x800, y300), (x900, y200)"; the frame coordinate color "red"; the usage period "Time zone: 8:00 to 22:00, day of the week: Monday to Friday."

The image acquisition device 13 is connected to the image pickup device 2 and configured to acquire images of a monitoring area captured by the image pickup device 2. The image acquisition device 13 is also connected to the image processing device 14 and the notification image generator 15, and configured to input the captured images acquired from the image pickup device 2 to the image processing device 14 and the notification image generator 15.

The image processing device 14 acquires captured images from the image acquisition device 13. When the captured images are still images captured at a predetermined time interval, the image processing device 14 acquires the images as still image data. When the captured images are moving images, the image processing device 14 acquires the images as a set of still image data (image frame data) extracted from the moving images at predetermined time intervals. The captured images (still image data) acquired by the image processing device 14 from the image acquisition device 13 are subject to processing operations performed by the object tracker 21, the unattended object detector 22, the object type determiner 23, and the alarm target determiner 24.

The object tracker 21 detects an object(s) appearing in the monitoring area (hereinafter referred to as "appearing object") from the captured images, and tracks each detected appearing object between the consecutive captured images after the detection of the appearing object. Examples of appearing objects include a paper bag, a store signboard, a closed-for-cleaning sign, and a bag. The object tracker 21 detects an appearing object by comparing a background image captured beforehand, with the acquired captured images, or by comparing between adjoining pairs of captured images in time order. Specifically, the object tracker 21 calculates the degree of difference (difference or correlation value) in the pixel values (e.g., luminance values) between the captured images to be compared, and then extracts pixels for which the calculated difference exceeds a predetermined threshold value. Then, the object tracker 21 determines an appearing object as a region formed by grouping the extracted pixels in proximity together into one region. When detecting one or more appearing objects from the captured images, the object tracker 21 assigns a unique ID to each detected appearing object, and tracks it between the captured images based on a corresponding ID.

The unattended object detector 22 detects an unattended object based on tracking results for each appearing object provided by the object tracker 21. Specifically, the unattended object detector 22, for each appearing object detected by the object tracker 21, determines a movement of the appearing object over time in the captured images, detects an appearing object which does not exhibit any movement over a predetermined time; that is, an appearing object that is stationary for the predetermined time, as an unattended object. When detecting an unattended object, the unattended object detector 22 assigns a unique ID to each detected unattended object and tracks it between the consecutive captured images based on a corresponding ID. Moreover, when detecting an unattended object, the unattended object detector 22 inputs the detection result to the notification image generator 15.

The object type determiner 23 determines the type (object type) of an unattended object detected by the unattended object detector 22. The object type determiner 23 can determine the object type of an unattended object by using a known image recognition technique such as a classifier using deep learning technology. For example, the object type determiner 23 preferably uses a classifier configured to identify the object type of an unattended object based on shape features and texture features of the unattended object detected from the captured images. In this case, the object type determiner 23 uses a database containing a shape feature and a texture feature of an unattended object corresponding to each type of unattended object, where the databased is prepared beforehand. The method for identifying object types of unattended objects adopted by the object type determiner 23 is not limited to the above-described method, and may be any of known proper methods. The object type determiner 23 provides the determined object type of an unattended object to the notification image generator 15.

The alarm target determiner 24 determines whether or not the unattended object detected by the unattended object detector 22 is an alarm target, i.e., an object for which an alarm needs to be issued. When the unattended object detector 22 has detected a plurality of unattended objects, the alarm target determiner 24 performs an operation for the determination (alarm target determination operation) for each unattended object (i.e., on an object-by-object basis).

The alarm target determiner 24 performs the alarm target determination operation by referring to mask area information stored in the mask area information storage 12. As described above, the mask area information includes, for each mask area, the geometry of a mask area (coordinates of the mask area frame image) and the designated unattended object(s) of the mask area. In the alarm target determination operation, the alarm target determiner 24 uses only a mask area having a usage period that is currently valid. When there are a plurality of mask areas in a monitoring area, the alarm target determiner 24 performs the alarm target determination operation on each mask area.

Specifically, the alarm target determiner 24 first determines whether or not an unattended object detected by the unattended object detector 22 is present in a mask area, by using a known proper technique such as a known image analysis technique. When determining the detected unattended object is not present in the mask area, the alarm target determiner 24 determines that the unattended object is an alarm target.

When determining that a detected unattended object is present in the mask area, the alarm target determiner 24 further determines whether or not the unattended object is a designated unattended object of the mask area. When determining that the object type of the unattended object is a designated unattended object, the alarm target determiner 24 determines that the unattended object is an unattended object for which issuance of an alarm is unnecessary (hereinafter, referred to as "non-alarm target"). When determining that the object type of the unattended object is not a designated unattended object of the mask area, the alarm target determiner 24 determines that the unattended object is an alarm target.

In other words, the alarm target determiner 24 determines only an unattended object(s) which is present in a mask area and is also a designated unattended object, as a non-alarm target, and otherwise determines unattended objects as alarm targets.

Figure 6A:
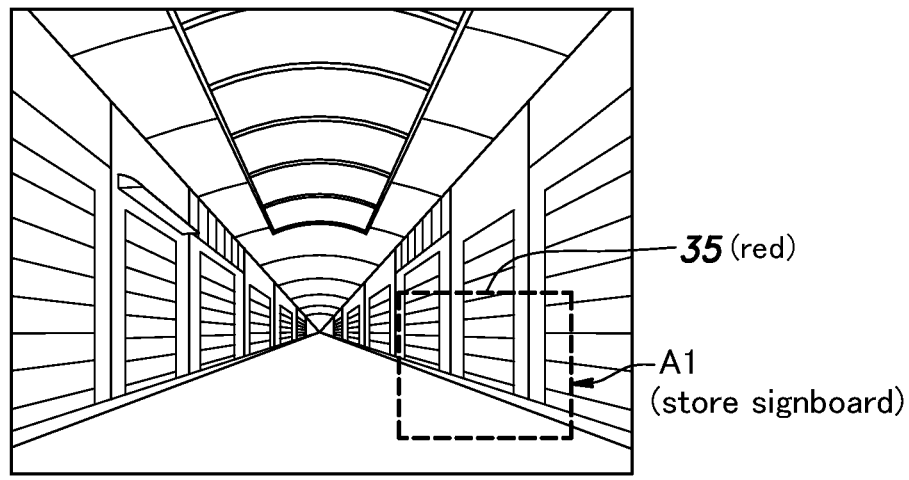
FIGS. 6A-C are diagrams showing examples of a determination operation performed by an alarm target determiner of the unattended object monitoring device.

FIG. 6 is a diagram showing examples of the alarm target determination operation performed by the alarm target determiner 24. In the example shown in FIG. 6A, a mask area A1 is preset on the lower right side of the monitoring area, and the designated unattended object of the mask area A1 is a store signboard. As the store signboard is associated with red, the mask area frame image 35 is colored red.

Figure 6B:
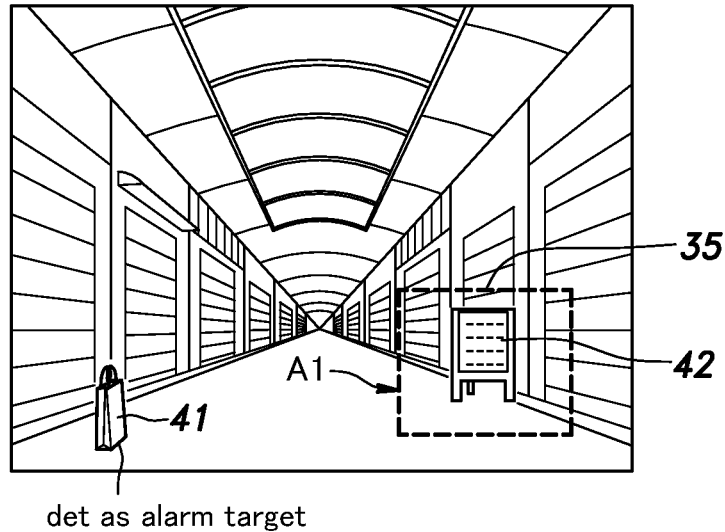

Furthermore, as shown in FIG. 6B, a paper bag 41 and a store signboard 42 are detected in the monitoring area. In this case, the alarm target determiner 24 determines whether or not the paper bag 41 and the store signboard 42 are present in the mask area A1. As described above, the alarm target determination operation is performed for each unattended object. In the example of FIG. 6B, the alarm target determiner 24 determines that the paper bag 41 is not present in the mask area A1, and that the store signboard 42 is present in the mask area A1. Thus, the alarm target determiner 24 determines the paper bag 41 as an alarm target.

Next, the alarm target determiner 24 further determines whether or not the store signboard 42 in the mask area A1 is a designated unattended object of the mask area A1. As the designated unattended object of the mask area A1 is a store signboard, the alarm target determiner 24 determines that the store signboard 42 is a designated unattended object. Thus, the alarm target determiner 24 determines that the store signboard 42 is a non-alarm target (see FIG. 6C).

In this way, the alarm target determiner 24 determines only an unattended object(s) which is present in a mask area and is also a designated unattended object, as a non-alarm target, and otherwise determines unattended objects as alarm targets.

Figure 7A:
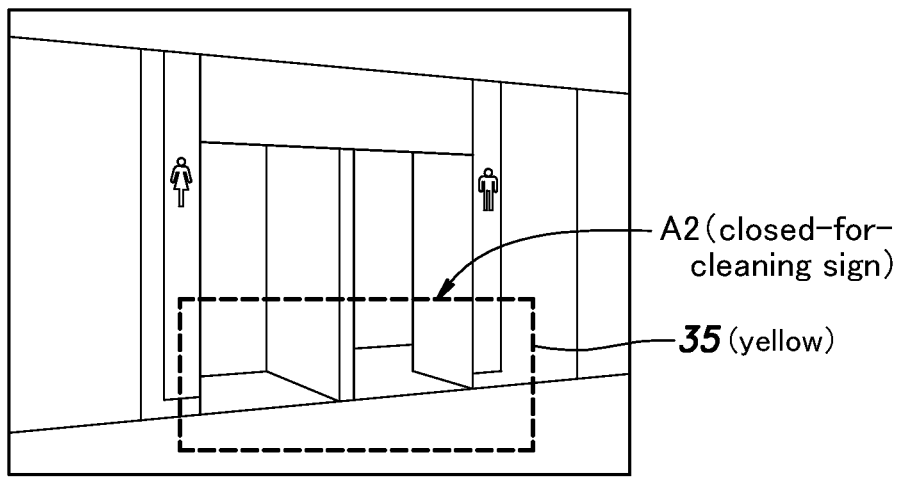
FIGS. 7A-C are diagrams showing examples of a determination operation performed by the alarm target determiner of the unattended object monitoring device.

In some cases, the unattended object detector 22 detects two or more unattended objects in one mask area. FIG. 7 is a diagram showing examples of the alarm target determination operation in such cases. As shown in FIG. 7A, a mask area A2 is preset on the lower center side of the monitoring area. The designated unattended object of the mask area A2 is a closed-for-cleaning sign. As the closed-for-cleaning sign is associated with yellow, the mask area frame image 35 is colored yellow.

Figure 7B:
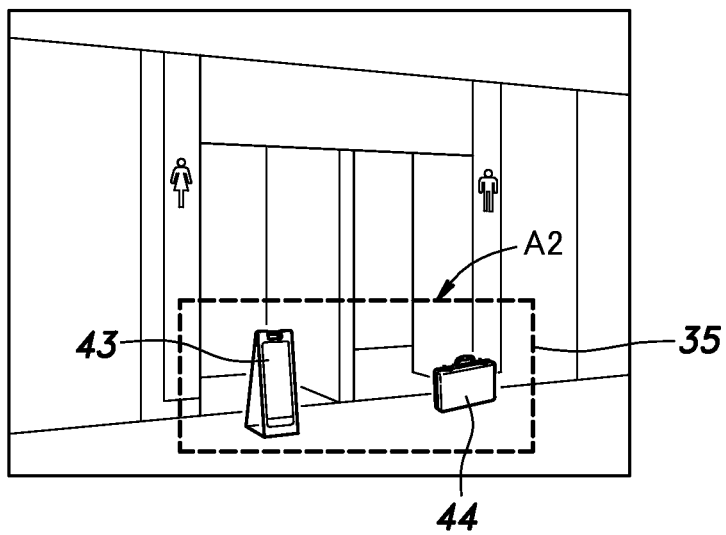

Furthermore, as shown in FIG. 7B, a closed-for-cleaning sign 43 and a bag 44 are detected in the monitoring area. In this case, the alarm target determiner 24 determines whether or not each of the closed-for-cleaning sign 43 and the bag 44 is present in the mask area A2. As described above, the alarm target determination operation is performed for each unattended object. In the example of FIG. 7B, the alarm target determiner 24 determines that each of the closed-for-cleaning sign 43 and the bag 44 is present in the mask area A2.

Next, the alarm target determiner 24 further determines whether or not each of the closed-for-cleaning sign 43 and the bag 44 in the mask area A2 is a designated unattended object of the mask area A2. As the designated unattended object of the mask area A2 is a closed-for-cleaning sign, the alarm target determiner 24 determines that the closed-for-cleaning sign 43 is a designated unattended object. Thus, the alarm target determiner 24 determines that the closed-for-cleaning sign 43 is a non-alarm target. The alarm target determiner 24 determines that the bag 44 is not a designated unattended object. Thus, the alarm target determiner 24 determines that the bag 44 is an alarm target (see FIG. 7C).

In this way, even when there are two or more unattended objects in one mask area, the alarm target determiner 24 performs the alarm target determination operation on each unattended object and determines whether or not the unattended object is an alarm target or a non-alarm target.

In some cases, the unattended object detector 22 detects two or more unattended objects in one mask area appearing in an overlapping manner. As it is rare that two or more unattended objects appear at the same time, the alarm target determiner 24 makes determination as to whether or not an unattended object is a designated unattended object and whether the unattended object is an alarm target or a non-alarm target, in the order of appearance of the two unattended objects. In this case, the determination operations are performed for each unattended object, as in the example of FIG. 7. First, as shown in FIG. 8A, the mask area A1 is preset on the lower right side of the monitoring area, and the designated unattended object of the mask area A1 is a store signboard. Since the store signboard is associated with red, the mask area frame image 35 is colored red.

Figure 8A:
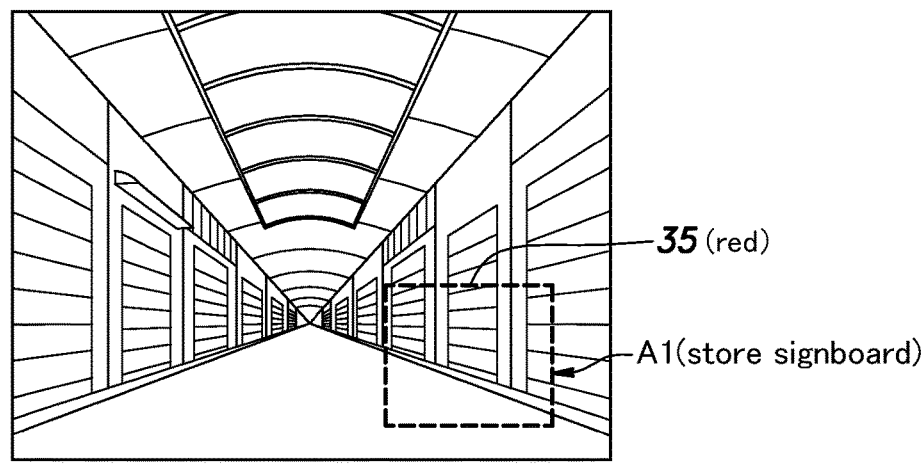
FIGS. 8A-C are diagrams showing examples of a determination operation performed by the alarm target determiner of the unattended object monitoring device.
Figure 8B:
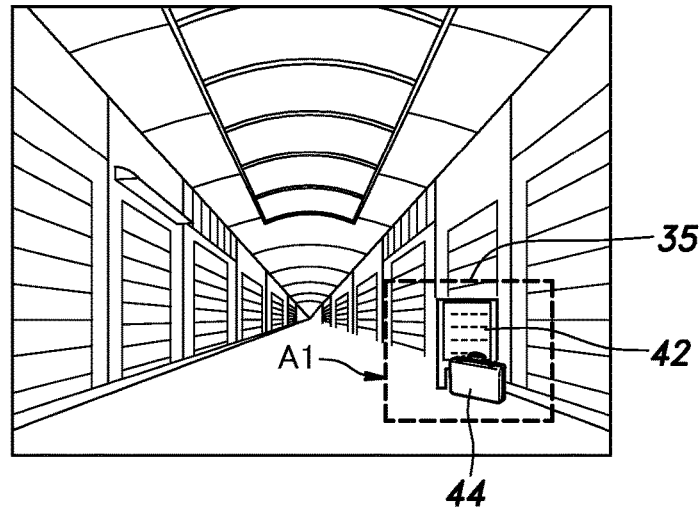

Furthermore, as shown in FIG. 8B, a store signboard 42 and a bag 44 are detected in the monitoring area. In this case, the alarm target determiner 24 determines whether or not each of the store signboard 42 is the bag 44 are present in the mask area A1. As described above, the alarm target determination operation is performed for each unattended object. In the example of FIG. 8B, the alarm target determiner 24 determines that each of the store signboard 42 and the bag 44 is present in the mask area A1.

Next, the alarm target determiner 24 further determines whether or not each of the store signboard 42 and the bag 44 in the mask area A1 is a designated unattended object of the mask area A1. As the designated unattended object of the mask area A1 is a store signboard, the alarm target determiner 24 determines that the store signboard 42 is a designated unattended object. Thus, the alarm target determiner 24 determines that the store signboard 42 is a non-alarm target. The alarm target determiner 24 determines that the bag 44 is not a designated unattended object. The alarm target determiner 24 determines that the bag 44 is an alarm target (see FIG. 8C).

As described above, as the unattended object detector 22 detects distinctively an unattended object and assigns a unique ID to each detected unattended object. Thus, even when two or more unattended objects are detected in one mask area and appearing in an overlapping manner, each detected unattended object can be identified. Thus, even when two or more unattended objects are detected and appear in an overlapping manner, the alarm target determiner 24 can make determination as to whether or not an unattended object is a designated unattended object and whether the unattended object is an alarm target or a non-alarm target, for each unattended object.

The alarm target determiner 24 provides determination results to the notification image generator 15.

The notification image generator 15 generates a notification image as an alarm for an alarm target based on a determination result from the alarm target determiner 24. Non-alarm targets are excluded from alarm target objects for which alarms are issued. Specifically, the notification image generator 15 generates a notification image for issuing an alarm as an alarm frame image surrounding an alarm target, an indication of object type, and a mask area frame image indicating a mask area overlaid on captured images provided from the image acquisition device 13. A mask area frame image overlaid on a notification image is not essential. The notification image generator 15 may be configured to allow a user to choose to show or hide a mask area frame image overlaid on the notification image.

An alarm frame image 51 is preferably formed to have a conspicuous color such as red or yellow. In some cases, the alarm frame image 51 may be blinked, and/or characters or pictures may be displayed adjacent to the alarm frame image to enhance the alarm. In the present embodiment, characters indicating an object type are used to notify a user of the type of an unattended object. Form of indication of the type of an unattended object is not limited to such characters, and may be other forms of indication such as a picture or a symbol indicating an object type.

Figure 9A:
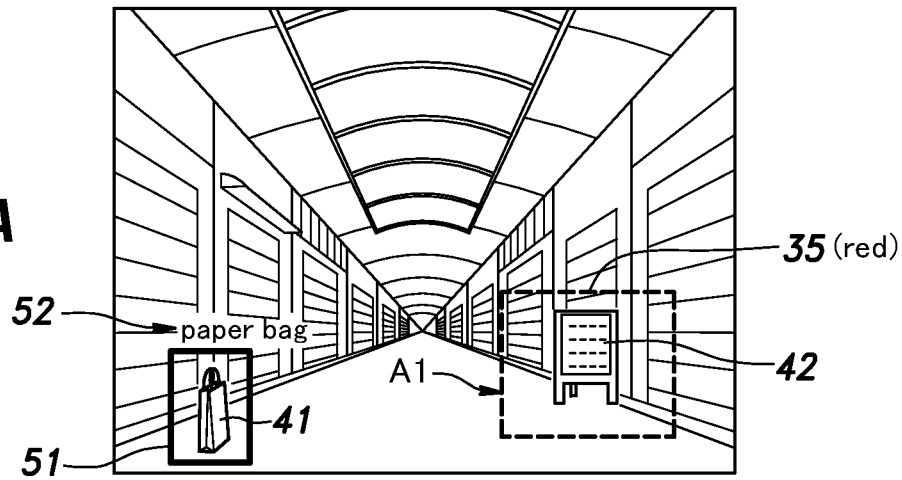
FIGS. 9A-C are diagrams showing examples of notification images.
Figure 9B:
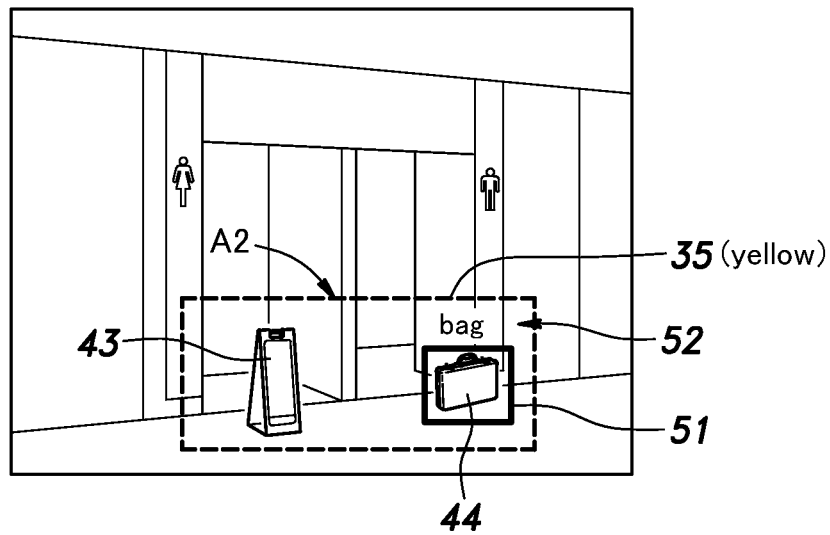
Figure 9C:
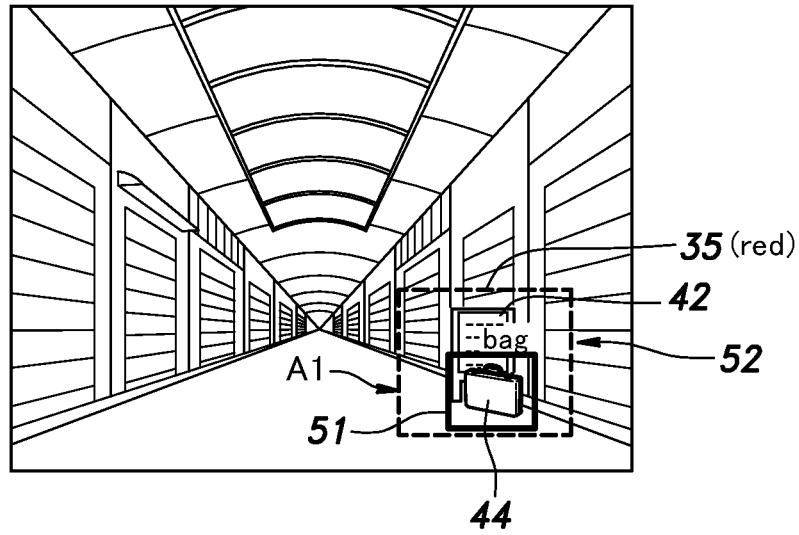

FIGS. 9A to 9C are diagrams showing examples of notification images generated by the notification image generator 15.

FIG. 9A is a diagram showing an example corresponding to the alarm target determination operation shown in FIG. 6. In the example of FIG. 9A, a paper bag 41 and a store signboard 42 are detected as unattended objects, and the paper bag 41 is determined to be an alarm target while the store signboard 42 is determined to be a non-alarm target. Thus, the notification image generator 15 generates a notification image P1 as a notification frame image 51 surrounding the paper bag 41, which is an alarm target, overlaid on the captured image. In the example of FIG. 9A, since the paper bag 41 is an unattended object to be notified, the characters 52 "paper bag" are further overlaid on the captured image as information indicating the object type. In addition, in the example of FIG. 9A, the mask area frame image 35 showing the mask area A1 is further overlaid on the captured image. Since the store signboard is associated with red, the mask area frame image 35 is colored red.

FIG. 9B is a diagram showing an example corresponding to the alarm target determination operation shown in FIG. 7. In the example of FIG. 9B, a closed-for-cleaning sign 43 and a bag 44 are detected as unattended objects, and the closed-for-cleaning sign 43 is determined to be a non-alarm target while the bag 44 is determined to be an alarm target. Thus, the notification image generator 15 generates a notification image P2 as a notification frame image 51 surrounding the bag 44, which is an alarm target, overlaid on the captured image. In the example of FIG. 9B, since the bag 44 is an unattended object to be notified, the characters 52 "bag" are further overlaid on the captured image as information indicating the object type. In addition, in the example of FIG. 9B, the mask area frame image 35 showing the mask area A2 is further overlaid on the captured image. Since the closed-for-cleaning sign is associated with yellow, the mask area frame image 35 is colored yellow.

FIG. 9C is a diagram showing an example corresponding to the alarm target determination operation shown in FIG. 6. In the example of FIG. 9C, a store signboard 42 and a bag 44 are detected as unattended objects, and the store signboard 42 is determined to be a non-alarm target while the bag 44 is determined to be an alarm target. Thus, the notification image generator 15 generates a notification image P3 as a notification frame image 51 surrounding the bag 44, which is an alarm target, overlaid on the captured image. In the example of FIG. 9C, since the bag 44 is an unattended object to be notified, the characters 52 "bag" are further overlaid on the captured image as information indicating the object type. In addition, in the example of FIG. 9C, the mask area frame image 35 showing the mask area A1 is further overlaid on the captured image. Since the store signboard is associated with red, the mask area frame image 35 is colored red.

The notification image generator 15 provides a generated notification image to the display device 4. Furthermore, the notification image generator 15 acquires capture images from the image acquisition device 13 and provides the captured images to the display device 4 as they are until the unattended object detector 22 detects an unattended object.

When displaying a notification image on the display device, the notification image generator 15 may be configured to provide an additional alarm by outputting alarm voice using a voice output function of the display device, or blinking an alarm lamp using an alarm device liked to the display device. This feature can provide a stronger alarm to alert an observer.

Figure 10:
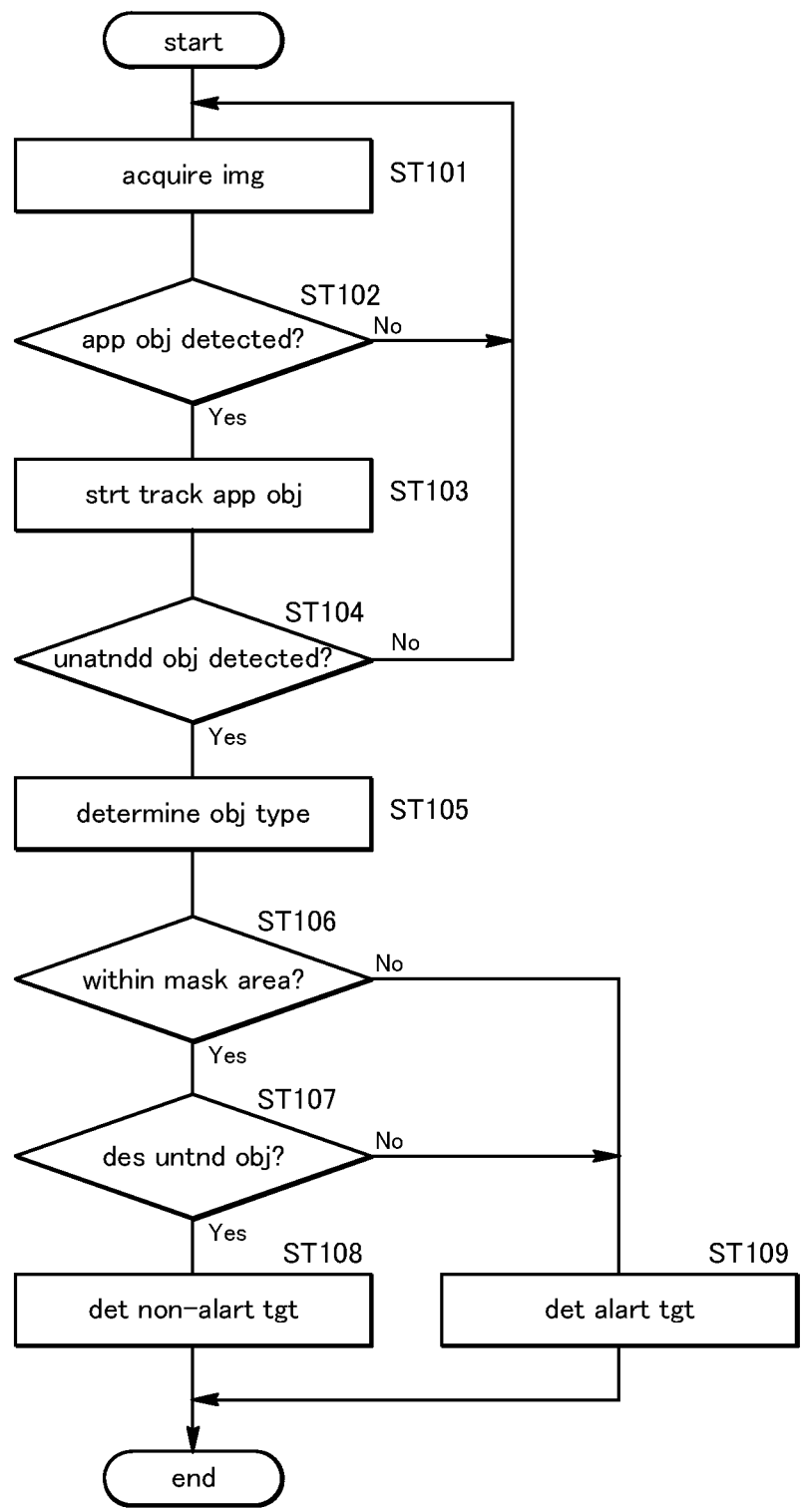
FIG. 10 is a flow chart showing an operation procedure of operations performed by the unattended object monitoring device.

Next, the following description with reference to a flow chart of FIG. 10 is about an operation procedure of operations performed by the unattended object monitoring device 3 of the unattended object monitoring system 1 according to the first embodiment as shown in FIG. 1.

First, the image acquisition device 13 acquires images captured by the image pickup device 2 and provides the captured images to the image processing device 14 and the notification image generator 15 (step ST101). Subsequently, the object tracker 21 detects, from the captured images, an appearing object that appears in the monitoring area (step ST102). When an appearing object is detected (step ST102: Yes), the process proceeds to step ST103. When any appearing object is not detected (step ST102: No), the process returns to step ST101.

In step ST103, after the detection of an appearing object, the object tracker 21 starts tracking each detected appearing object between the captured images. In step ST104, the unattended object detector 22 detects, as an unattended object, an appearing object which does not exhibit any movement over a predetermined time based on the tracking result for each appearing object from the object tracker 21. When an unattended object is detected (step ST104: Yes), the process proceeds to step ST105. When an unattended object is not detected (step ST104: No), the process returns to step ST101. In the case of returning to step ST101, in the next step ST102, the object tracker 21 detects a new appearing object; that is, an appearing object other than the already detected appearing object(s).

In step ST105, the object type determiner 23 determines the object type of the unattended object detected by the unattended object detector 22. As described above, the object type determiner 23 performs this object type determination operation for each unattended object. The same applies to the subsequent other determination operations performed in the image processing device.

Next, in step ST106, the alarm target determiner 24 determines whether or not the unattended object detected by the unattended object detector 22 is present in a preset mask area in the monitoring area (see FIGS. 6B, 7B and 8B). As described above, the alarm target determiner 24 performs the alarm target determination operation using only a mask area(s) for which its usage period is valid. When two or more mask areas are preset in the monitoring area, the alarm target determiner 24 performs the alarm target determination operation for each mask area.

When the alarm target determiner 24 determines that an unattended object detected by the unattended object detector 22 is present in the mask area (step ST106: Yes), the process proceeds to step ST107. When the alarm target determiner 24 determines that a detected unattended object is not present in the mask area (step ST106: No), the process proceeds to step ST109.

Figure 6C:
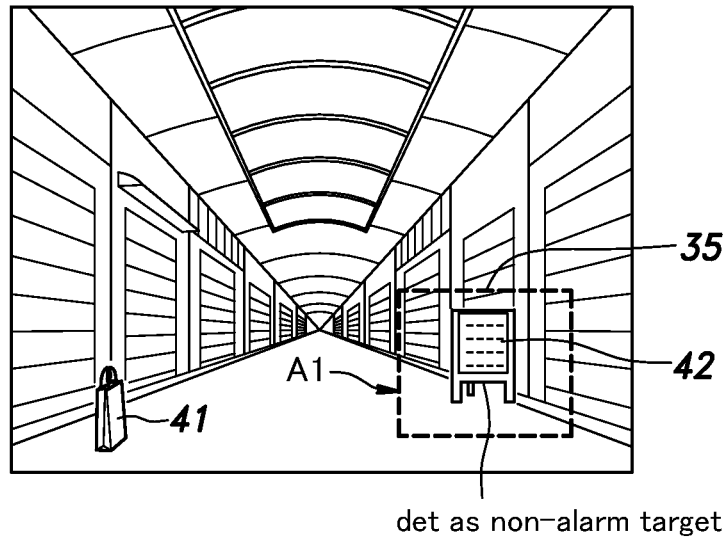
Figure 7C:
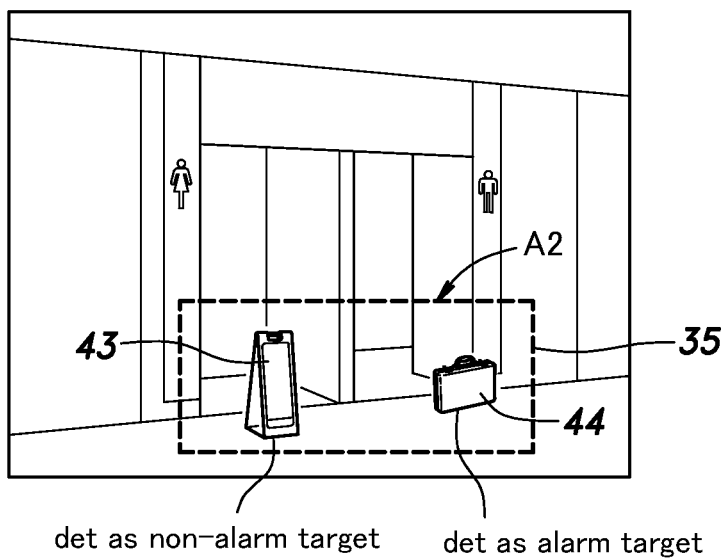
Figure 8C:
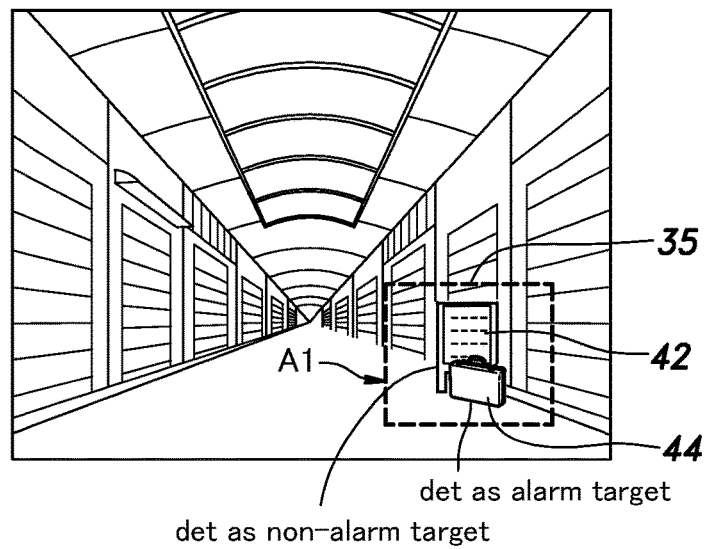

In step ST107, the alarm target determiner 24 further determines whether or not the object type of an unattended object is a designated unattended object of the mask area (see FIGS. 6C, 7C, and 8C). When the alarm target determiner 24 determines that the object type of the unattended object is a designated unattended object of the mask area (step ST107: Yes), the process proceeds to step ST108. When the alarm target determiner 24 determines that the object type of the unattended object is not a designated unattended object of the mask area (step ST107: No), the process proceeds to step ST109.

In step ST108, the alarm target determiner 24 determines that an unattended object is a non-alarm target, and then ends the alarm target determination operation.

In step ST108, the alarm target determiner 24 determines that an unattended object is an alarm target, and then ends the alarm target determination operation.

As described above, according to the first embodiment, it is possible to exclude an unattended object that is determined to be present in a mask area preset in a monitoring area from alarm target objects for which alarms are issued. This reduces the number of alarm target objects for which alarms are issued, thereby enabling a reduction in the burden on an observer. Furthermore, according to the first embodiment, an unattended object that is determined to be present in the mask area can be excluded from alarm target objects for which alarms are issued only when the object type of the unattended object is one associated with the mask area. This configuration can exclude objects of types for which issuance of alarms is unnecessary, from alarm target objects for which alarms are issued, thereby enabling a further reduction in the burden on an observer.

Second Embodiment

Figure 11:
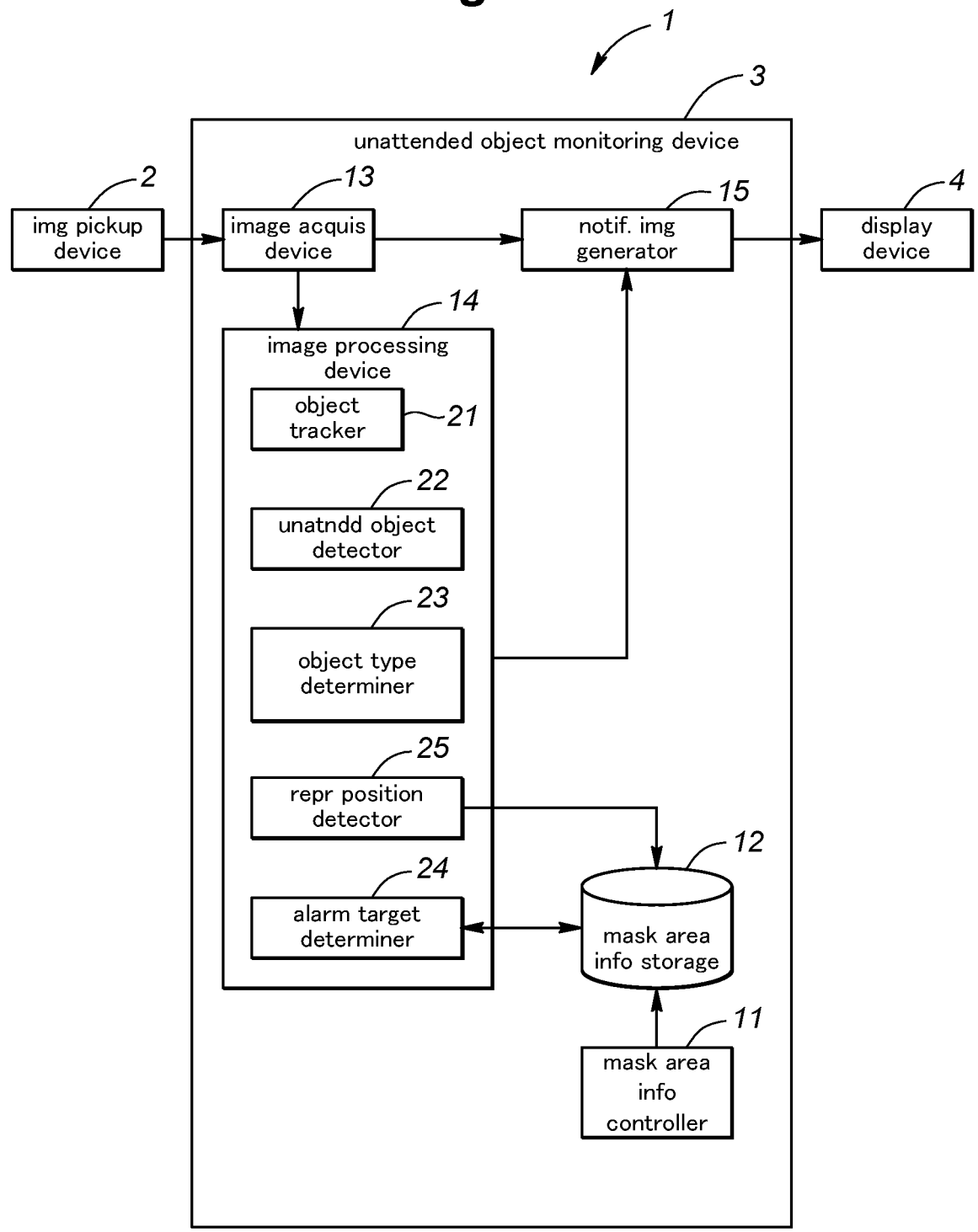
FIG. 11 is a diagram showing a schematic configuration of an unattended object monitoring system according to a second embodiment of the present invention.

Next, an unattended object monitoring system 1 according to a second embodiment of the present invention will be described with reference to FIGS. 11 to 13. The second embodiment is different from the first embodiment shown in FIG. 1 in that an image processing device 14 of the unattended object monitoring device 3 further includes a representative position detector 25. Except the use of the representative position detector, the configuration of the second embodiment is the same as that of the first embodiment, and thus the same features as in the first embodiment are denoted by the same reference numerals, and the description thereof will not be repeated.

When the unattended object detector 22 detects an unattended object, the representative position detector 25 detects a representative position of the detected unattended object by using a known image analysis technique. Examples of the representative position of an unattended object include the position of the center of gravity or the center of the lower end of an image of the unattended object.

Figure 12A:
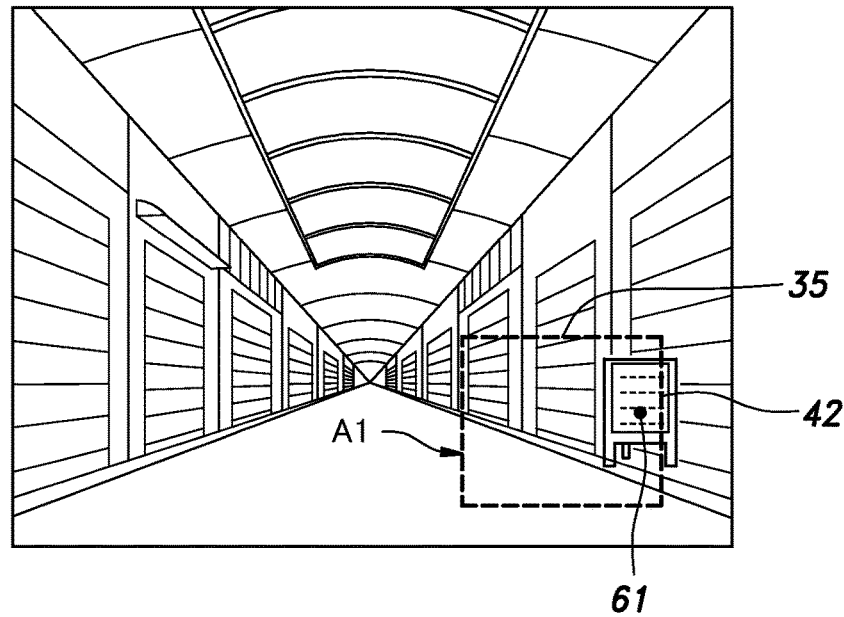
FIGS. 12A-B are diagrams showing examples of representative positions of unattended objects.
Figure 12B:
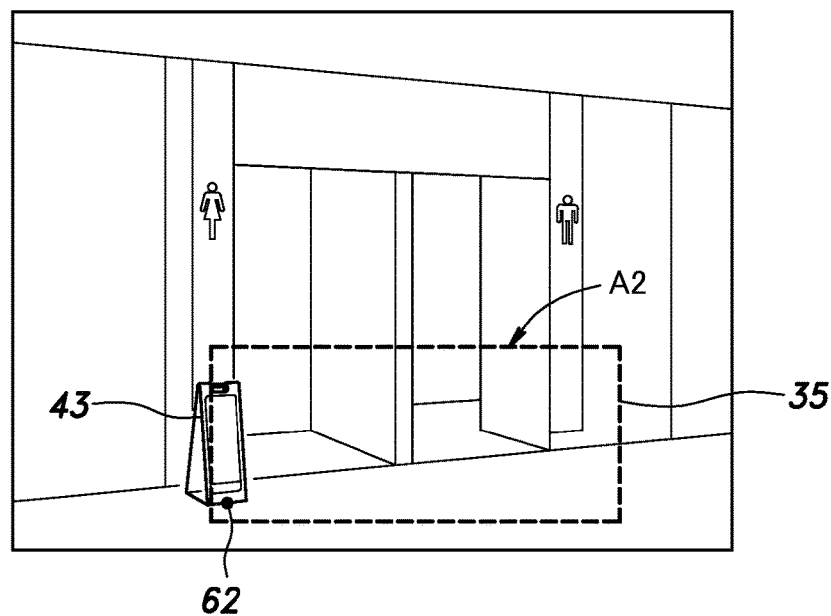

FIG. 12 is a diagram showing examples of representative positions of unattended objects. FIG. 12A shows an example in which the center of gravity of an object is used as a representative position. FIG. 12B shows an example in which the center of the lower end of an object is used as a representative position. In the example of FIG. 12A, a store signboard 42 is detected as an unattended object, and the representative position detector 25 detects a position 61 that is the center-of-gravity of the store signboard 42 as a representative position thereof. In the example of FIG. 12B, a closed-for-cleaning sign 43 is detected as an unattended object, and the representative position detector 25 detects a position 61 that is the center of the lower end of the closed-for-cleaning sign 43 as a representative position thereof.

In the second embodiment, the alarm target determiner 24 determines whether or not an unattended object is present in a mask area based on the representative position of the unattended object detected by the representative position detector 25. Specifically, when the representative position of an unattended object is present in a mask area, the alarm target determiner 24 determines that the unattended object is present in the mask area. In the example of FIG. 12A, although the right side of the store signboard 42 partially protrudes from the mask area A1, the position 61 of the center of gravity of the store signboard 42 is present in the mask area A1. Thus the alarm target determiner 24 determines that the store signboard 42 is present in the mask area A1. In the example of FIG. 12B, although the left side of the closed-for-cleaning sign 43 partially protrudes from the mask area A2, the position 62 of the center of the lower end of the closed-for-cleaning sign is present in the mask area A2. Thus the alarm target determiner 24 determines that the closed-for-cleaning sign 43 is present in the mask area A2.

In this way, the alarm target determiner 24 determines whether or not an unattended object is present in a mask area based on the representative position (such as a position of the center of gravity or the center of the lower end) of the unattended object, thereby enabling more accurate and easier determination as to whether or not an unattended object is in a mask area.

Positions that can be a representative position of an unattended object are not limited to the position of the center of gravity or the center of the lower end of the object, and may be various other positions such as the positions of the center of the upper end, the upper left end, the upper right end, the lower left end, and the lower right end of an object. However, the lower end part or any other part of an unattended object is sometimes hidden behind a passerby or other unattended objects, which prevents the representative position detector 25 from detecting the position of the center of gravity or the center of the lower end of the object. In such a case, the position of the center of the upper end, the upper left end, the upper right end, or any other point may be used as a representative position of the unattended object.

In the second embodiment, the image processing device 14 may change the geometry of a mask area based on statistical data of the representative position of a designated unattended object of the mask area. For example, a signboard such as a store signboard 42 and a closed-for-cleaning sign 43 may be placed in different positions on a daily basis. Even after placing such a signboard, the position of the signboard may be changed due to a collision with a passerby or other reason. Thus, it is beneficial to change the geometry of a mask area according to the actual location of a designated unattended object.

Specifically, the image processing device 14 first accumulates position data of the representative position of a designated unattended object detected by the unattended object detector 22 for a predetermined period of time, and creates statistical data of the representative position of the designated unattended object. Then, the image processing device 14 analyzes the created statistical data using a known statistical analysis technique, and changes the geometry of a mask area according to the actual location of the designated unattended object.

In the second embodiment, the image processing device 14 changes the geometry of a mask area by moving the position of the mask area. Specifically, the image processing device 14 may move the position of a mask area such that the representative position of a designated unattended object is within a predetermined distance from the center position of the geometry of the mask area. In the present embodiment, the geometry of a mask area is defined by the upper left and lower right coordinates of a rectangular frame of a mask area frame image. Thus, the image processing device 14 determines the center position (coordinates) of the geometry of a mask area based on the upper left and lower right coordinate of a mask area frame image. The predetermined distance from the center position of the geometry of a mask area is preferably a distance determined such that an entirety of the designated unattended object can be included within the geometry of the mask area.

Figure 13A:
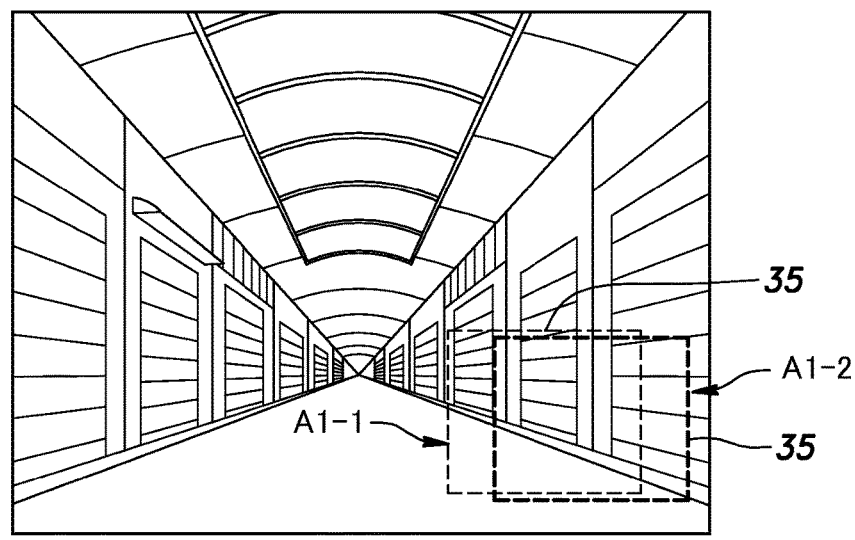
FIGS. 13A-B are diagrams showing examples of changing the geometry of a mask area.
Figure 13B:
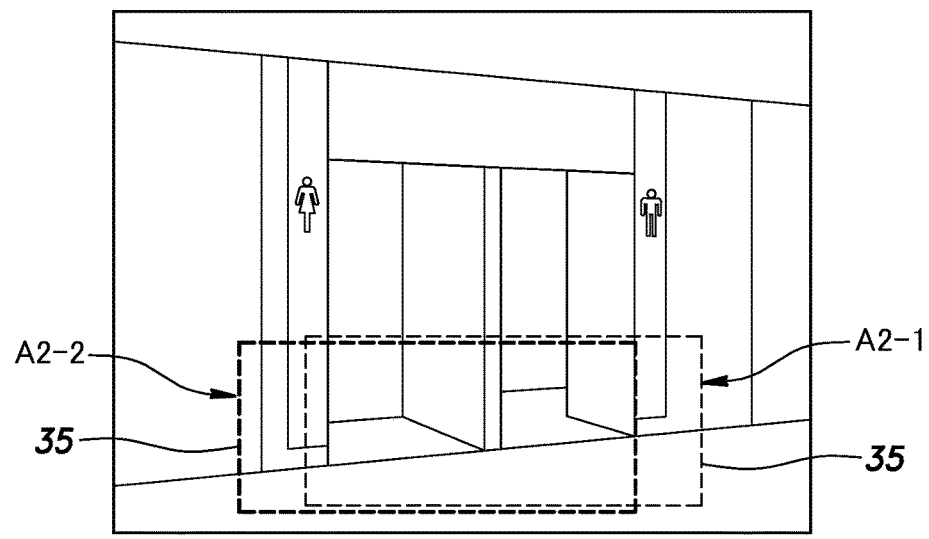

FIG. 13 is a diagram showing examples of changing the geometry of a mask area. FIG. 13A shows an example of changing the geometry of a mask area A1, where A1-1 denotes the mask area A1 before the geometry change, and A1-2 denotes the mask area A1 after the geometry change. As shown in the figure, after the geometry change, the position of the mask area A1 is moved to the right. FIG. 13B shows an example of changing the geometry of a mask area A2, where A2-1 denotes the mask area A2 before the geometry change, and A2-2 denotes the mask area A2 after the geometry change. As shown in the figure, after the geometry change, the position of the mask area A2 is moved to the left.

In the examples of FIG. 13, the geometry of a mask area was changed by moving the position of the mask area. However, the geometry change is not limited to the change in the position of a mask area. For example, the change in the geometry of a mask area may be made by changing the size of the mask area. In this case, the geometry of a mask area may be changed by increasing or decreasing the size of the mask area based on statistical data of representative positions of a designated unattended object. In other cases, the change in the geometry of a mask area may be made by changing the shape of the mask area. In this case, the geometry of a mask area may be changed by changing the shape of the mask area from an initially rectangular shape to any different shape based on statistical data of representative positions of a designated unattended object.

In this way, as the change in geometry of a mask area is made based on statistical data of the representative position of a designated unattended object, the image processing device 14 can set the geometry of the mask area more accurately according to the actual position of an unattended object.

Specific embodiments of the present invention are described herein for illustrative purposes. However, the present invention is not limited to those specific embodiments. In the embodiments of an unattended object monitoring device, an unattended object monitoring system equipped with the device, and an unattended object monitoring method as described above, not all elements therein are essential. Thus, various modifications including elimination of some elements may be made to the embodiments as appropriate without departing from the scope of the invention.

INDUSTRIAL APPLICABILITY

An unattended object monitoring device, an unattended object monitoring system equipped with the same, and an unattended object monitoring method according to the present invention are useful as an unattended object monitoring device, an unattended object monitoring system equipped with the same, and an unattended object monitoring method, which can exclude a detected unattended object for which issuance of an alarm is unnecessary from alarm target objects for which alarms are issued.

GLOSSARY

1 unattended object monitoring system
2 image pickup device
3 unattended object monitoring device
4 display device (notification device)
11 mask area information controller
12 mask area information storage
13 image acquisition device
14 image processing device
15 notification image generator
21 object tracker
22 unattended object detector
23 object type determiner
24 alarm target determiner
25 representative position detector

The invention claimed is:

1. An unattended object monitoring device for detecting an unattended object left behind in a monitoring area based on images of the monitoring area captured by an image pickup device, and issuing an alarm when detecting the unattended object, the device comprising:
  a processing device for performing processing operations required for detecting unattended objects, wherein the processing device is configured to:
    set an alarm suppression area, preset in the monitoring area, in association with an object type of a designated unattended object;
    detect an object appearing in the monitoring area from captured images captured by the image pickup device and track each detected object between the captured images;
    detect, as an unattended object, an object that does not move for more than a predetermined time based on a tracking result for each detected object;
    determine whether or not the detected unattended object is present in the alarm suppression area, preset in the monitoring area, and whether or not the detected unattended object is the designated unattended object according to the object type of the detected object; and
    when determining that the detected unattended object is present in the alarm suppression area and the detected unattended object is the designated unattended object, exclude the detected unattended object from alarm target objects for which alarms are issued.

2. The unattended object monitoring device according to claim 1, wherein the processing device generates a setting screen that enables a user to set the alarm suppression area in the monitoring area.

3. The unattended object monitoring device according to claim 1, wherein
  the processing device generates images in which a frame image surrounding the alarm suppression area is overlaid on the captured images, and
  wherein the processing device determines a form of the frame image depending on the type of the designated unattended object associated with the alarm suppression area.

4. The unattended object monitoring device according to claim 3, wherein the processing device determines the color of the frame image according to the type of the designated unattended object set in association with the alarm suppression area.

5. The unattended object monitoring device according to claim 1, wherein the processing device is configured to:
  detect a representative position of the designated unattended object where the object type of the designated unattended object has been determined to be one associated with the alarm suppression area;
  store data of the representative position for a predetermined period of time to create statistical data of the representative position; and
  change a geometry of the alarm suppression area based on the statistical data of the representative position.

6. The unattended object monitoring device according to claim 1,
  wherein the processing device determines the alarm suppression area is in association with a usage period, the usage period being a period of time in which the alarm suppression area is used, and
  wherein, only for an alarm suppression area having a usage period that is currently valid, the processing device determines whether or not the detected designated unattended object is present in the alarm suppression area.

7. The unattended object monitoring device according to claim 1, wherein the processing device detects a representative position of the detected unattended object, and determines, based on the detected representative position, whether or not the detected unattended object is present in the alarm suppression area.

8. The unattended object monitoring device according to claim 1, wherein, when detecting a plurality of unattended objects in the alarm suppression area, the processing device performs the subsequent determination operations for each of the plurality of unattended objects.

9. The unattended object monitoring device according to claim 8, wherein the processing device generates images in which a frame image surrounding the unattended object excluding the designated unattended object is overlaid on the captured image.

10. An unattended object monitoring system comprising:
  the unattended object monitoring device according to claim 1;
  an image pickup device for capturing the images of the monitoring area; and
  a notification device for notifying a user of an alarm issued from the unattended object monitoring device.

11. An unattended object monitoring method for detecting an unattended object left behind in a monitoring area based on images of the monitoring area captured by an image pickup device, and issuing an alarm when detecting the unattended object by executing plural processes with a processor comprising:

setting an alarm suppression area, preset in the monitoring area, in association with an object type of a designated unattended object;

acquiring captured images of the monitoring area captured by the image pickup device;

detecting an object appearing in the monitoring area from captured images and tracking each detected object between the captured images;

detecting, as an unattended object, an object that does not move for more than a predetermined time based on a tracking result for each detected object;

determining whether or not the detected unattended object is present in the alarm suppression area, preset in the monitoring area, and whether or not the detected unattended object is the designated unattended object according to the object type of the detected object; and when determining that the detected unattended object is present in the alarm suppression area and the detected unattended object is the designated unattended object, excluding the detected unattended object from alarm target objects for which alarms are issued.

\* \* \* \* \*